May 29, 1928.

R. C. ZUCKERMAN 1,671,263

ONION HARVESTER

Filed Oct. 13, 1924

INVENTOR

R.C.Zuckerman

BY [signature] ATTORNEY

Patented May 29, 1928. 1,671,263

UNITED STATES PATENT OFFICE.

ROSCOE C. ZUCKERMAN, OF STOCKTON, CALIFORNIA.

ONION HARVESTER.

Application filed October 13, 1924. Serial No. 743,296.

This invention relates to improvements in agricultural machinery, my principal object being to provide a machine for gathering onions from the ground after they are pulled and placed in windrows, for then cutting the tops off the onions, subsequently removing therefrom any light foreign matter, such as loose onion skins and small pieces of dirt, then grading the same according to different sizes, and finally sacking the onions according to the graded sizes.

This machine, while not only adaptable for large sized onions, is also especially useful in handling the small sized onions, which, while having considerable market value, are at present mostly considered as waste, since the cost of harvesting the same under the present methods is greater than the returns warrant.

With my improved machine this waste may be entirely eliminated, and all the crop may be harvested and put to use.

These and other objects I accomplish by means of such structure and relative arrangement of parts as will fully appear by a perusal of the following specification and claims.

In the drawings similar characters of reference indicate corresponding parts in the several views.

Figure 2:
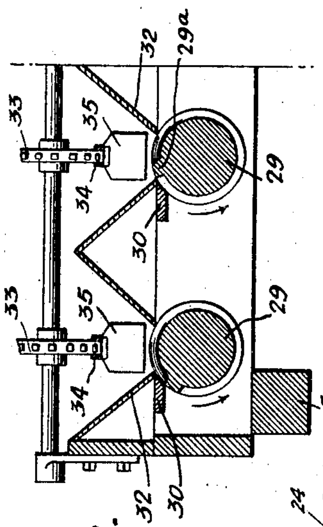
Fig. 2 is a partial cross section on the line 2—2 of Fig. 1.
Figure 1:
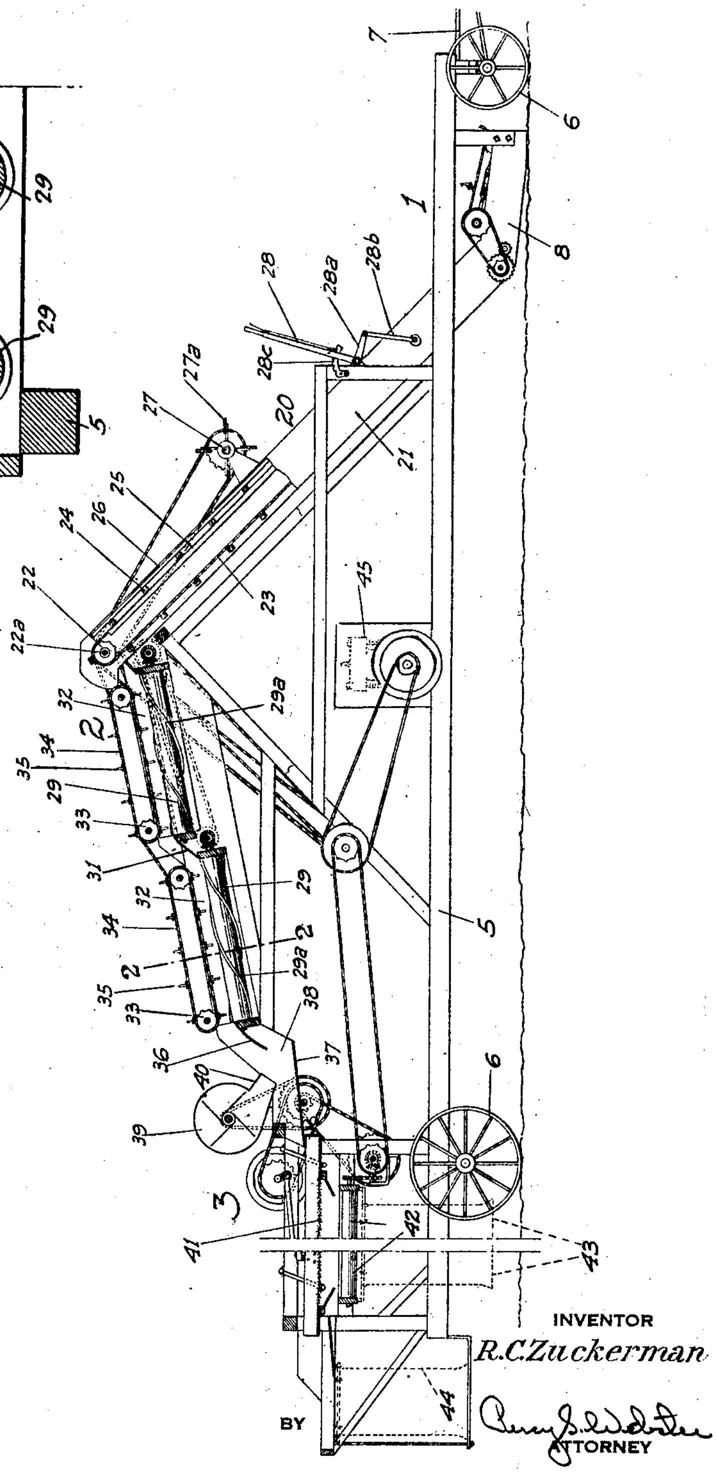
Fig. 1 is a side view of the complete harvester, partly broken out and in section.

Referring now more particularly to the characters of reference on the drawings, the harvester may be considered as comprising three units, 1 representing the onion gathering structure, 2 the onion topping mechanism, and 3 the grading structure. These three units are mounted in successive fore and aft relation to each other on a common framework indicated generally at 5, which framework is supported on suitable wheels 6 and has at its front end a draw bar 7 whereby the harvester may be attached to a tractor or other draft means.

Starting with a more specific description at the front end of the structure, at which end the gathering mechanism is located, said mechanism includes transversely spaced side members 8 of suitable height. The lower ends of these members are adapted to come fairly close to the ground. Fixed between these side members is an onion scooping means which is featured in my U. S. Patent No. 1,642,287, dated Sept. 13, 1927.

The scooping means 9 discharges at its rear end onto the lower end of an upwardly slanting conveyor structure indicated generally at 20. This conveyor structure comprises side members 21 rigidly attached to or formed as a part of the members 8. Between these said side members are mounted upper and lower sprockets 22, the shaft $22^a$ of the upper sprocket being pivotally mounted on the frame structure 5 and forming an axis about which the entire conveyor and onion gathering unit may be turned.

Passing about sprockets 22 are endless chains 23 having transverse cleats 24 fixed thereon at suitable intervals. The upper cleats travel over a flooring which consists of transversely spaced and longitudinally extending bars 25. The cleats are prevented from rising up and allowing any onions to be jammed thereunder by means of guide rails 26 attached to the side members 21, and under which the ends of the cleats 24 pass.

The stationary bars 25, are used to form the floor of the conveyor, so as to allow any dirt with the onions to be separated therefrom, and with this desired form of floor, I have found that the guide rails are an absolute necessity to prevent the cleats from rising off the floor and failing to function as conveying means.

Journaled to the side members 21 intermediate the ends thereof is a driven shaft 27 to which are fixed radially extending paddles $27^a$, which extend transversely of the conveyor. Said paddles are arranged to rotate in the direction opposite to the travel of the conveyor and are so disposed that they clear the conveyor just sufficiently to cause a single row of onions to lie on the conveyor below the sphere of influence of the paddles. To raise and lower the gathering unit 1 from the ground, as may be necessary for different conditions and when transporting the machine from place to place without operating the same, I provide a lever 28 mounted on the frame structure 5. From the lower end of this lever a substantially horizontal arm $28^a$ extends, between the outer ends of which arm and the conveyor 20 a link $28^b$ extends. This lever has a pawl and ratchet mechanism $28^c$ of comon character, by means of which the unit to which it is attached may be held in any desired position.

The upper end of this conveyor discharges [illegible] into the topping unit 32. This unit comprises transversely spaced and longitudinally extending topping rolls 29 [illegible] of common construction and which have a [illegible] downward slant from front to rear. These rolls are driven in any suitable manner and engage [illegible] 30. These topping rolls are preferably arranged as two [illegible] units [illegible] longitudinally spaced apart [illegible] from the upper unit passing to the [illegible] lower unit. This arrangement serves to reverse the position of the onions from one topping unit to the other and insures that any [illegible] passing over the upper unit will be topped while moving over the lower unit.

The onions are positively guided above the rolls by means for preventing [illegible] walls 32 extending lengthwise of the rolls, [illegible] forming a trough above the rolls. This insures that the onions will be kept moving, [illegible] positively exposed so that they will be engaged by the cutting elements 29a on the rolls, [illegible] mounted between the rolls at the [illegible] ends thereof is a [illegible] driven [illegible] sprocket wheels 33. Over these sprockets pass endless chains 34 on which are fixed fingers 35. These fingers project outwardly from the chains and depend [illegible] through the [illegible] necessary [illegible] between the rolls [illegible] to be moved into engagement with the rolls with the rotation of the [illegible] fingers.

The onions from the lower topping unit are discharged over an apron 36 onto a platform 37, a vertical space 38 being provided between the lower end of the apron and the adjacent surface of the platform. Above the platform is a blower fan 39 whose outlet 40 faces said space 38. It will therefore be seen that as the onions drop from the apron onto the platform the blast from the fan will remove all foreign matter which may be mixed with the onions as they drop through said space, leaving the onions in a clean condition. It is to be understood that the force of the blast from the fan is just sufficient to carry off said light matter, and is not strong enough to blow the onions themselves off the platform.

The platform 37 has a slight downward slant and discharges onto the forward end of a slat-screen structure 41, while forms the main element of the gathering mechanism.

Gathering mechanisms of this character are of common construction, and besides the [illegible] screen include transverse [illegible] spaced ledges 42 [illegible] from the screen. Said slats [illegible] the onions [illegible] dumped at 43, [illegible] in the usual manner [illegible] at the outer end of the ledges. The [illegible] than top passed through the screen into a sack [illegible] indicated at 44.

All the drive parts of this harvester are operated from a self-contained power plant mounted on the frame 5, such as a gas engine indicated at 45. While I have shown [illegible] in the accompanying drawings, [illegible] driving [illegible] to the various members of the device, [illegible] arrangement [illegible] any [illegible] desired, [illegible] it is not thought to be necessary. Also it will be evident that as is customary, in an apparatus of this kind [illegible] will likely have to be placed at different [illegible] points [illegible] mentioned without interfering with the [illegible], and although I have not shown [illegible] any suitable [illegible] devices [illegible] the same if desired.

Also it is to be further understood that while I have specifically described this harvester as being intended primarily for the handling of onions, it may also be adapted to handle other produce as well, and therefore the right to use the same for such other purposes should be [illegible].

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and desire to secure by Letters Patent is:

1. An onion topping structure consisting of a plurality of topping units arranged in continuous alignment and along which the onions travel from one to the other, and means for deflecting the onions to the [illegible] of the topping structure, the units being arranged successively lower [illegible] whereby onions moving from one unit to the [illegible] unit will be [illegible] with [illegible] movement to be altered in position so as [illegible] any [illegible] not [illegible] by the first unit to be exposed relative to the next unit so as to be engaged thereby.

2. An onion topping structure consisting of a plurality of topping units arranged in continuous alignment and along which the onions travel from one to the other, the units being arranged successively lower [illegible] between the [illegible] ends of adjacent units whereby the onions [illegible] will [illegible] from one [illegible] position relative to the [illegible]

3. In combination, an onion topping mechanism, a driven conveyor leading to the topping mechanism, a rigid rotatable structure disposed transversely of and above the conveyor, the periphery of the structure when adjacent the conveyor clearing the same not less than the thickness of an onion, and means for rotating said structure in a direction opposite to that of the conveyor.

4. An onion topping structure including a pair of longitudinally separated topping rolls, along which the onions travel from end to end, and means for causing the onions as they pass from one roll to the other to alter their positions relative to the rolls whereby to reposition any onion tops not removed by the first unit and tend to place them into engaging relationship with the second roll.

In testimony whereof I affix my signature.

ROSCOE C. ZUCKERMAN.